US011468108B2

(12) United States Patent
Liu

(10) Patent No.: US 11,468,108 B2
(45) Date of Patent: Oct. 11, 2022

(54) DATA PROCESSING METHOD AND APPARATUS, AND ELECTRONIC DEVICE THEREOF

(71) Applicant: LENOVO (BEIJING) LIMITED, Beijing (CN)

(72) Inventor: Shuai Liu, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 16/587,440

(22) Filed: Sep. 30, 2019

(65) Prior Publication Data

US 2020/0026724 A1 Jan. 23, 2020

Related U.S. Application Data

(63) Continuation of application No. PCT/CN2017/102942, filed on Sep. 22, 2017.

(30) Foreign Application Priority Data

Mar. 30, 2017 (CN) .......................... 201710202705.5

(51) Int. Cl.
*G06F 16/30* (2019.01)
*G06F 16/35* (2019.01)
*G06F 16/338* (2019.01)

(52) U.S. Cl.
CPC ............ *G06F 16/35* (2019.01); *G06F 16/338* (2019.01)

(58) Field of Classification Search
CPC ........ G06F 16/35; G06F 16/338; G06F 16/31; G06F 16/3344; G06F 16/9535;
(Continued)

(56) References Cited

U.S. PATENT DOCUMENTS

| 9,348,920 B1 * | 5/2016 | Kesin ...................... G06F 16/93 |
| 2008/0154873 A1 * | 6/2008 | Redlich ................. G06F 16/951 |
| | | 707/999.005 |

(Continued)

FOREIGN PATENT DOCUMENTS

| CN | 103903164 A | 7/2014 |
| CN | 104615593 A | 5/2015 |

(Continued)

OTHER PUBLICATIONS

The World Intellectual Property Organization (WIPO) International Search Report for PCT/CN2017/102942 dated Jan. 4, 2018 2 Pages.

*Primary Examiner* — Sana A Al-Hashemi
(74) *Attorney, Agent, or Firm* — Anova Law Group, PLLC

(57) ABSTRACT

The present disclosure provides a data processing method. The method includes the steps of constructing a keyword library of an obtained comment corpus associated with a target object, the keyword library comprising a plurality of keywords; extracting a plurality of partial comment corpora from the comment corpus, each partial comment corpus of the plurality of partial comment corpora comprising a plurality of comment words including at least one of the plurality of keywords in the keyword library; combining the plurality of partial comment corpora to produce a candidate corpus; and performing a topic clustering process on the candidate corpus of each keyword to obtain a subject term for the target object.

19 Claims, 6 Drawing Sheets

(58) Field of Classification Search
CPC .. G06F 16/334; G06F 16/5854; G06F 16/951; G06F 16/9024
USPC ........ 707/609, 687, 705, 769, 790, 813, 821
See application file for complete search history.

(56) References Cited

U.S. PATENT DOCUMENTS

| | | |
|---|---|---|
| 2009/0300046 A1 | 12/2009 | Abouyounes |
| 2011/0314031 A1* | 12/2011 | Chittar ................ G06F 16/5854 707/E17.019 |
| 2015/0227588 A1* | 8/2015 | Shapira ................ G06F 16/334 707/722 |
| 2017/0103110 A1* | 4/2017 | Winstanley ........... G06F 16/334 |
| 2018/0060302 A1* | 3/2018 | Liang ...................... G06F 16/35 |
| 2018/0113933 A1* | 4/2018 | Lewis ................. G06F 16/9024 |
| 2018/0246973 A1* | 8/2018 | Zhao ................... G06F 16/9535 |

FOREIGN PATENT DOCUMENTS

| | | |
|---|---|---|
| CN | 104778209 A | 7/2015 |
| CN | 105512277 A | 4/2016 |
| CN | 106445912 A | 2/2017 |
| CN | 106970988 A | 7/2017 |
| JP | 2013015971 A | 1/2013 |
| WO | 2012060928 A1 | 5/2012 |

* cited by examiner

DATA PROCESSING METHOD AND APPARATUS, AND ELECTRONIC DEVICE THEREOF

CROSS-REFERENCES TO RELATED APPLICATION

This application claims priority to PCT Application No. PCT/CN2017/102942, filed on Sep. 22, 2017, which in turn claims priority to Chinese Patent Application No. 201710202705.5, entitled "Data Processing Method and Apparatus, and Electronic Device Thereof" filed on Mar. 30, 2017. The entire content of the two applications are incorporated herein by reference.

FIELD OF TECHNOLOGY

The present disclosure relates to the field of data processing technology, and more specifically, to a data processing method and apparatus, and an electronic device thereof.

BACKGROUND

An information organization method is a method used to perform content analysis, indexing, and processing of information resources for the purpose effective information retrieval. Organized information resources serve an important role in various internet applications.

Generally, in order to carry out a targeted product development to better meet the user demands, it may be necessary to understand the users' focus on a product or an entire industry. As such, a topic clustering analysis may be performed on the user feedback information of users who use a specific product or users in a specific industry to obtain topic category information of the specific product or the specific industry that the users may be focused on. That is, it is important to understand the users' focus.

However, in conventional technology, topic clustering is generally performed based on a corpus of long text such as news reports. If a long text is used to analyze user feedback information, multiple subject terms may be easily obtained, and it may be difficult to determine the users' focus. Further, if the extraction of the subject terms is performed by using the traditional manual method, it may consume a lot of manpower and resources, and the efficiency may be low.

BRIEF SUMMARY OF THE DISCLOSURE

One aspect of the present disclosure provides a data processing method. The method includes the steps of constructing a keyword library of an obtained comment corpus associated with a target object, the keyword library comprising a plurality of keywords; extracting a plurality of partial comment corpora from the comment corpus, each partial comment corpus of the plurality of partial comment corpora comprising a plurality of comment words including at least one of the plurality of keywords in the keyword library; combining the plurality of partial comment corpora to produce a candidate corpus; and performing a topic clustering process on the candidate corpus of each keyword to obtain a subject term for the target object.

Another aspect of the present disclosure provides a computer readable medium containing program instructions for causing a computer to perform the method of; constructing a keyword library of an obtained comment corpus associated with a target object, the keyword library comprising a plurality of keywords; extracting a plurality of partial comment corpora from the comment corpus, each partial comment corpus of the plurality of partial comment corpora comprising a plurality of comment words including at least one of the plurality of keywords in the keyword library; combining the plurality of partial comment corpora to produce a candidate corpus; and performing a topic clustering process on the candidate corpus of each keyword to obtain a subject term for the target object.

Another aspect of the present disclosure provides an electronic device. The electronic device includes a communication module configured to obtain a comment corpus associated with a target object; and a processor configured to construct a keyword library of the obtained comment corpus; extract a plurality of partial comment corpora including a first keyword from the keyword library, and combine the partial comment corpora to obtain a candidate corpus of the first keyword; and perform a topic clustering process on the obtained candidate corpus of each keyword to obtain a subject term of the target object.

BRIEF DESCRIPTION OF THE DRAWINGS

To clearly understand the present disclosure and advantages thereof, the present disclosure is described below with reference to the accompany drawings, in which.

DETAILED DESCRIPTION

Figure 1:
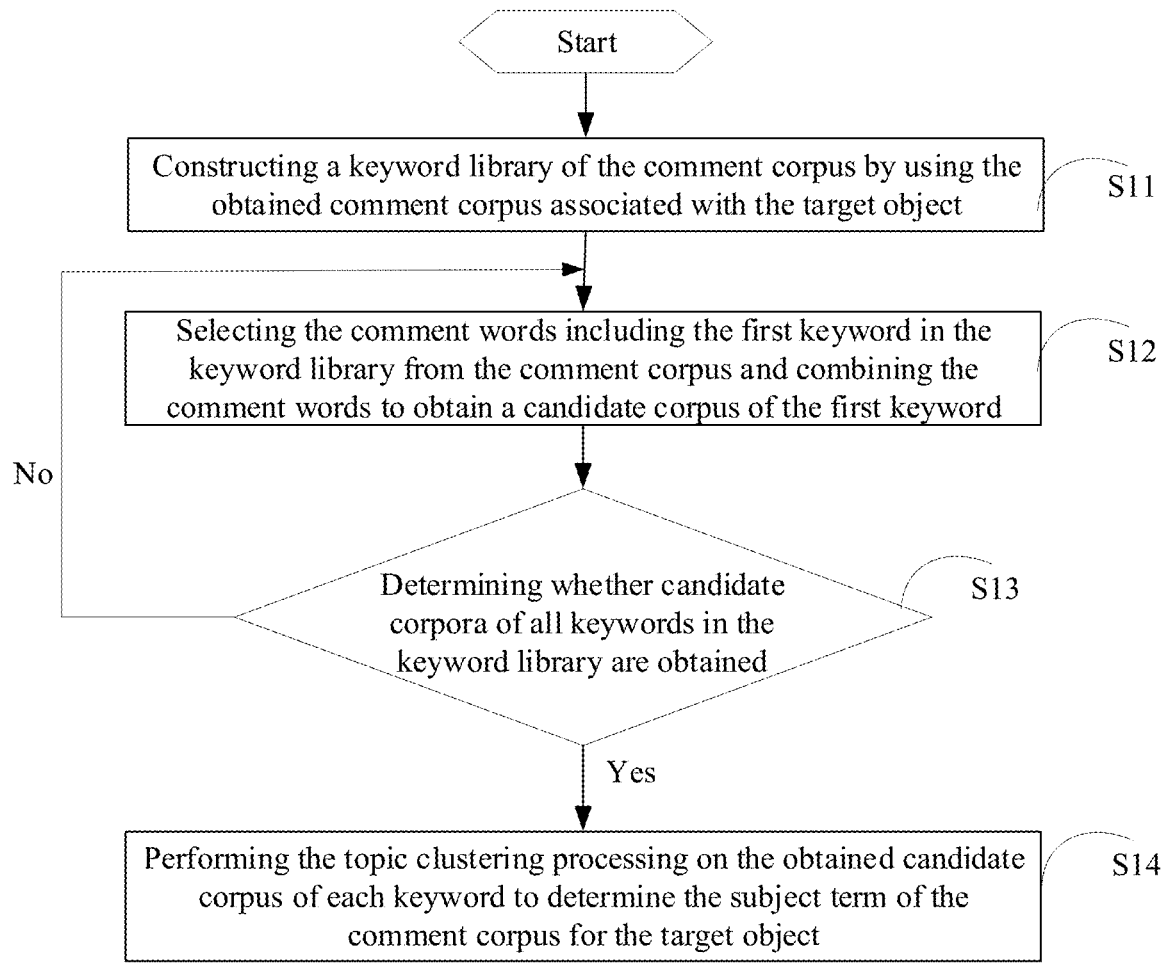
FIG. 1 is a flowchart illustrating a data processing method according to an embodiment of the present disclosure.

Hereinafter, the embodiments of the present disclosure will be described with reference to the accompanying drawings. It should be understood, however, that these descriptions are merely illustrative and are not intended to limit the scope of the present disclosure. In addition, in the following description, descriptions of well-known structures and techniques are omitted so as not to obscure the concept of the present disclosure.

Terms used herein are for describing embodiments only and are not intended to limit the present disclosure. The terms "including", "comprising", and the like, as used herein, indicate the presence of stated features, steps, operations, and/or components, but do not exclude the presence or addition of one or more other features, steps, operations, or components.

Unless otherwise defined, all the technical and scientific terms used herein have the same or similar meanings as generally understood by those skilled in the art. It should be noted that terms used herein should be interpreted as having meanings that are consistent with the context of the present specification and should not be interpreted in an idealized or overly rigid manner.

In terms of a statement similar to "at least one of A, B, and C, etc.," it should be generally interpreted in the light of the ordinary understanding of the expression by those skilled in the art. For example, "a system including at least one of A, B, and C" shall include, but is not limited to, a system including A alone, a system including B alone, a system including C alone, a system including A and B, a system including A and C, a system including B and C, and/or a system including A, B, and C, etc. In terms of a statement similar to "at least one of A, B or C, etc.", it should generally be interpreted in the light of the ordinary understanding of the expression by those skilled in the art. For example, "a system including at least one of A, B or C" shall include, but is not limited to, a system including A alone, a system including B alone, a system including C alone, a system including A and B, a system including A and C, a system including B and C, and/or a system including A, B, and C, etc. It should also be understood by those skilled in the art that all transitional words and/or phrases representing two or more alternative items, whether in the description, the claims or the drawings, should be understood as including one of these alternative items, or including any one of or all these alternative items. For example, the phrase "A or B" should be interpreted to include possibilities of including "A" or "B", or including "A" and "B".

Some block diagrams and/or flowcharts are shown in the drawings. It should be understood that some blocks and/or flows or combinations thereof in the block diagrams and/or the flowcharts can be implemented by computer program instructions. These computer program instructions may be provided to a processor of a general-purpose computer, a special-purpose computer, or other programmable-data processing device such that, when executed by the processor, these instructions can generate a device that can implement functions/operations illustrated in these block diagrams and/or flowcharts.

Thus, the techniques of the present disclosure may be implemented in the form of hardware and/or software (including firmware, microcode, etc.). In addition, the techniques of the present disclosure may be in a form of a computer program product on a computer-readable medium that stores instructions. The computer program product can be used by or in connection with an instruction execution system. In the context of the present disclosure, a computer-readable medium may be any medium that can contain, store, communicate, propagate, or transport the instructions. For example, the computer-readable medium may include, but is not limited to, an electronic, magnetic, optical, electromagnetic, infrared or semiconductor system, apparatus, device, or propagation medium. Further, examples of the computer-readable medium include: a magnetic storage device such as a magnetic tape or a hard disk (HDD); an optical storage device such as a compact disk read-only memory (CD-ROM); a memory such as a random-access memory (RAM) or a flash memory; and/or a wired/wireless communication link.

With the development of network technology, various network products in various fields such as audio and video information, online gaming, shopping applications, payment applications, and other applications are available on the market and these products have greatly improved the convenience in a user's life.

Generally, in order to understand a user's experience in using these network products, developers may arrange a user comment option in these products. As such, after a user finishes using a network product, the user may provide comments related to the product by using the user comment option. The developers may analyze the user's comments to learn about the user's focus and turnoffs of the product, and improve the product accordingly. As such, the product may become more suitable for the users and its market share may expand.

In addition, if a developer is planning on developing a product in a specific field, the developer may also analyze the user's comments on the related products in the same field. As such, the developer may gain a good understanding of the user's focus on products in this field and develop the product accordingly.

For the various use cases described above, in conventional technology, a topic clustering analysis is generally used to process the obtained user comment information (i.e., a comment corpus) to obtain the corresponding subject terms (e.g., the user's focus). However, in natural language processing, topic clustering analysis is generally used to analyze long text corpora such as news reports, and the obtained user comment corpora are generally short texts. Since the feature words in short texts may be sparse, their dependencies may be strong. If the topic clustering analysis is performed on short texts, it may be difficult to obtain the subject terms. In addition, since the meaning of the subject terms in the comment data of some user comment corpora may not be clear, multiple subject terms may be obtained, which may not achieve the effect of the topic clustering analysis. In order to improve the accuracy of the subject term extraction, a manual method may be used to extract the subject information. However, this method is associated with high manpower consumption, high cost, and low work efficiency.

In view of the foregoing, the present disclosure provides a data processing method and apparatus, and an electronic device thereof. The method includes: constructing a keyword library of the comment corpus by using the obtained comment corpus associated with the target object; selecting a plurality of comment words including a first keyword in the keyword library from the comment corpus and combining the comment words to obtain a candidate corpus of the first keyword, where the comment words may be a partial comment corpus including the first keyword; and performing topic clustering processing on the obtained candidate corpus of the first keyword to obtain a subject term for the target object of the comment corpus. The data processing method provided in the present disclosure may be used to improve the situation of obtaining multiple subject terms by directly applying the topic clustering algorithm on the short text corpus. Further, it may not be necessary to manually extract the subject term from the short text corpus, which may reduce the manpower and resource consumption, and greatly improve the work efficiency.

FIG. 1 is a flowchart illustrating a data processing method according to an embodiment of the present disclosure. The data processing method is described in more detail below.

S11, constructing a keyword library of the comment corpus by using the obtained comment corpus associated with the target object.

In one embodiment, after obtaining the comment corpus associated with the target object, the comment corpus may be processed by using word segmentation. A Term Frequency-Inverse Document Frequency (TF-IDF) algorithm may be used to calculate an Inverse Document Frequency (IDF) value of each word processed by the word segmentation. Subsequently, the keywords in the comment corpus may be selected based on the IDF values, and the keyword library may be constructed based on these keywords.

In particular, the TF-IDF algorithm is a statistical method used to assess the importance of a word for a file set or a file in a corpus database. The importance of a word may increase proportionally with the number of times it appears in the file, and the importance of a word may decrease inversely with the frequency it appears in the corpus database. In addition, the IDF value may be used as a measure of the importance of the corresponding word, which may be obtained by dividing the total number of words in the file by the number of the word and taking the logarithm of the quotient, which will be not described in detail herein.

Therefore, in the present embodiment, the IDF value may be used to determine whether the corresponding word may be a keyword. Generally, the greater the IDF value, the more likely the corresponding word may be a keyword. More specifically, in the present disclosure, a word whose IDF value is greater than a predetermined threshold may be selected as a candidate keyword.

To improve the accuracy of the keywords to improve the processing efficiency, in the present disclosure, an unrelated word filtering may be performed on the candidate keywords. That is, comment words that are not related to the features of the target object may be deleted, such as "I," "it," and other personal pronouns, and interjections. Further, in the present disclosure, subject terms that are commonly used in a specific field may be added such that the obtained keyword library may be more comprehensive.

It should be noted that the present disclosure does not limit the specific implementation process for constructing the keyword library of the comment corpus, and the method of determining the candidate keywords may not be limited to the TF-IDF algorithm mentioned above. In addition, the implementation method for filtering the unrelated words of the candidate keywords is not limited in the present disclosure.

S12, selecting the comment words including the first keyword in the keyword library from the comment corpus and combining the comment words to obtain a candidate corpus of the first keyword.

In one embodiment, the comment words may be a part of the candidate corpus including the first keyword, such as an instance of the first keyword and n words adjacent to the first keyword. For example, the comment words may include a plurality of instances of the first keyword in the obtained comment corpus and the n words adjacent to each of the instances of the first keyword.

In one embodiment, the initially obtained comment corpus associated with the target object may be scanned to determine the first keyword included therein and obtain a plurality of words adjacent to the first keyword. Subsequently, the comment words of the first keyword may be combined to obtain a long text corpus of the first keyword, that is, the candidate corpus.

The combination order of the plurality of comment words of first keywords is not limited in the present disclosure, and the comment words may be combined in any order to obtain the long text corpus. In addition, the method of obtaining the comment words of the first keyword is not limited to the method described above.

It should be noted that the first keyword mentioned above may be any keyword in the keyword library, and the present disclosure does not specifically refer to a certain keyword.

S13, determining whether the candidate corpora of all keywords in the keyword library may be obtained, if yes, proceed to S14; if no, return to S12 to continue selecting the comment words of the keywords until the corpora of all keywords in the keyword library are obtained.

In one embodiment, in the present disclosure, whether all keywords are filtered may be determined by comparing the number of candidate corpus with the number of keywords in the keyword library. Of course, the filtering operation mentioned above may be performed in the order of keywords in the keyword library. As such, whether the filtering is completed may be determined by determining whether the first keyword of the candidate corpus obtained this time is the last keyword in the keyword library.

In addition, it should be noted that when the determination result of the filtering process is no, a new first keyword may be selected to obtain the corresponding candidate corpus. As such, in the filtering processing, the filtered keywords may be marked to avoid repeated filtering or missing filtering, but it is not limited to this method.

S14, performing the topic clustering processing on the obtained candidate corpus of each keyword to determine the subject term of the comment corpus for the target object.

In one embodiment, in the present embodiment, after obtaining the candidate corpora of all keywords in the keyword library, a candidate corpus database may be generated. Subsequently, the topic clustering algorithm may be used to perform topic clustering on the candidate corpora to obtain the subject term for the target object.

By using the above method, the candidate corpus may be a long text. As such, the corresponding subject term may be obtained by using the topic clustering algorithm without manually extracting the subject term, thereby reducing the labor cost and greatly improving the data processing efficiency.

It can be seen that, comparing to the conventional technology, a long text including the first keyword may be obtained by constructing the keyword library of the comment corpus associated with the target object; and selecting the comment corpus including comment words of the first keyword in the keyword library and combining the comment words of the first keyword to obtain the candidate corpus. Further, topic clustering may be performed on the candidate corpus of each keyword, and the subject term for the target object in the comment corpus may be accurately obtained. The data processing method provided in the present disclosure may be used to improve the situation of obtaining a plurality of subject terms by directly applying the topic clustering algorithm on the short text corpus. Further, it may not be necessary to manually extract the subject term from the short text corpus, which may reduce the manpower and resource consumption, and greatly improve the work efficiency.

In view of the foregoing description, the present disclosure further provides an embodiment of the data processing method. In practice, the implementation process should not be limited to the following embodiment, and the following embodiment is merely provided as an example.

In one embodiment, selecting the comment words including the first keyword in the keyword library from the comment corpus and combining the comment words to obtain the candidate corpus of the first keyword includes: scanning the comment corpus; and extracting one or more comment words including a detected first keyword and one or more adjacent words included in the currently scanned comment corpus for a first keyword in the keyword library. The distance between the adjacent words and the first keyword may be within a predetermined length, and the extracted comment words corresponding to the first keyword may be combined into a candidate corpus.

In one embodiment, the scanning may start with the first comment corpus in the comment corpus database. Of course, the scanning may be performed using other methods. In addition, the scanning order of the comment corpus in the comment corpus database is not limited in the present disclosure.

In one embodiment, the adjacent words may be within the predetermined length from the first keyword, and the first keyword may be any keyword in the keyword library, and it may not refer to a certain keyword. It can be seen that, in the present disclosure, for each keyword in the keyword library, the corresponding comment words may be determined by extracting one or more comment words including a detected first keyword and one or more adjacent words included in the currently scanned comment corpus for a first keyword in the keyword library.

The combination order of the obtained plurality of comment words of first keywords is not limited in the present disclosure, and the comment words may be combined in any order.

In one embodiment, constructing the keyword library of the comment corpus by using the obtained comment corpus associated with the target object includes: obtaining the candidate keywords in the comment corpus associated with the target object; and filtering the unrelated words of the obtained candidate keywords to obtain the keyword library of the comment corpus, where the unrelated words may be the comment words that are not related to the features of the target object.

In one embodiment, the method may further include: supplementing the keyword library with a plurality of predetermined keywords for the target object.

In the present embodiment, the predetermined keywords may be the subject terms commonly used in the field of the target object. In particular, the content of the predetermined keywords may be different for different target objects. For example, if the target object is a cellphone, the predetermined keywords may include standby time, performance, etc.; if the target object is a watch, the corresponding predetermined keywords may include waterproof, accuracy, longevity, etc., and other predetermined keywords are not listed in the present disclosure.

It can be seen that by supplementing the subject terms in the industry, the obtained keyword library may be more comprehensive, which may lay a strong foundation for accurately obtaining the subject terms of the target object.

In one embodiment, extracting one or more comment words including a detected first keyword and one or more adjacent words included in the currently scanned comment corpus for a first keyword in the keyword library may include: extracting the comment words including the first keyword from the currently scanned comment corpus by using a window having a predetermined length, where the length of the window may be greater than a character length of the first keyword.

In one embodiment, when determining comment words corresponding to the keyword, the window having the predetermined length may be used to extract the comment words including the first keyword from the currently scanned comment corpus. It should be noted that the length of the window having the predetermined length may be greater than the character length of the first keyword to ensure that the selected comment words of the window having the predetermined length may include the keyword while including other words.

In the implementation of the present embodiment, a window having a predetermined length for a fixed position may be arranged, and the word in the window may be detected in real time. Subsequently, the corresponding IDF value may be calculated by using the method mentioned above to determine whether the detected word may be a candidate keyword. More specifically, after determining the first keyword, the first character of the first keyword may be used as the first character in the window having the predetermined length, or the last character of the first keyword may be used as the last character of the window to determine the comment word in the window.

Of course, in the present disclosure, it may be possible to analyze a position of the keyword appearing in the comment corpus by using the historical operation data, and the window having the predetermined length may be arranged at a position to obtain the comment word of the candidate keyword. However, the present disclosure does not limit the specific implementation manner of determining the comment word of the candidate keyword by using the window having the predetermined length at the fixed position.

In one embodiment, the window having the predetermined length may be moved based on the specific content of the comment corpus to obtain the comment word of the candidate keyword. More specifically, if a candidate keyword is scanned during the scanning of the comment corpus, a window having the predetermined length may be generated thereon. Further, the position of the window having the predetermined length may be adjusted based on the words before and after the candidate keyword. Subsequently, the word in the window having the predetermined length may be determined as the comment word corresponding to the candidate keyword.

Figure 3:
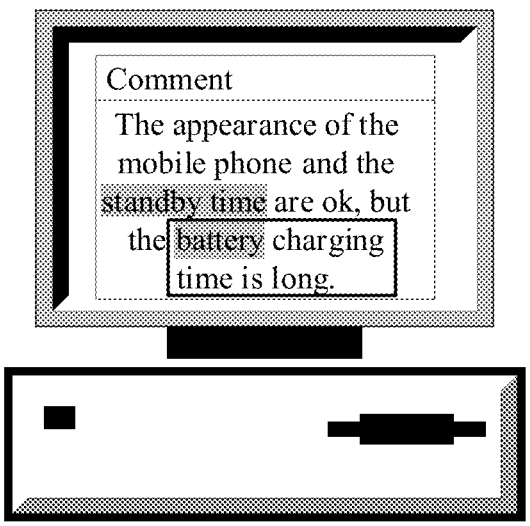
FIG. 3 is a diagram illustrating a display application of a keyword and a plurality corresponding comment words according to an embodiment of the present disclosure.

Referring to FIG. 3, after the keyword "battery" is detected, the window having the predetermined length may be moved to the position, and the comment word (such as "the battery charging time is long") corresponding to the keyword may be selected, but the present disclosure is not limited herein.

In addition, in the present disclosure, after the candidate keyword is scanned, the n words before and/or after the candidate keyword may be directly used as the comment words, where n may be an integer greater than or equal to 1. Further, the implementation manner of determining the comment word of the candidate keyword is not limited in the present disclosure.

In one embodiment, obtaining the candidate keywords in the comment corpus associated with the target object may include: performing word segmentation on the comment corpus associated with the target object; calculating the IDF value of each word after the word segmentation by using the TF-IDF algorithm; and selecting words whose IDF values may be greater than the predetermined threshold as the candidate keywords.

In some embodiments, the comment corpus may be obtained through a third party. Further, the comment corpus corresponding to a user identifier and associated with the target object of each application platform may be obtained by using a plurality of user identifiers. The implementation manner of acquiring the comment corpus is not limited in the present disclosure.

In one embodiment, the unrelated words may be the comment words such as the various personal pronouns that may not be related to the features of the target object. Further, the unrelated words corresponding to the different comment corpora may be different. The method of determining the unrelated words and the content of the unrelated words is not limited in the present disclosure.

The present disclosure will be explained in detail below with reference to FIG. 2 through FIG. 4.

Figure 2:
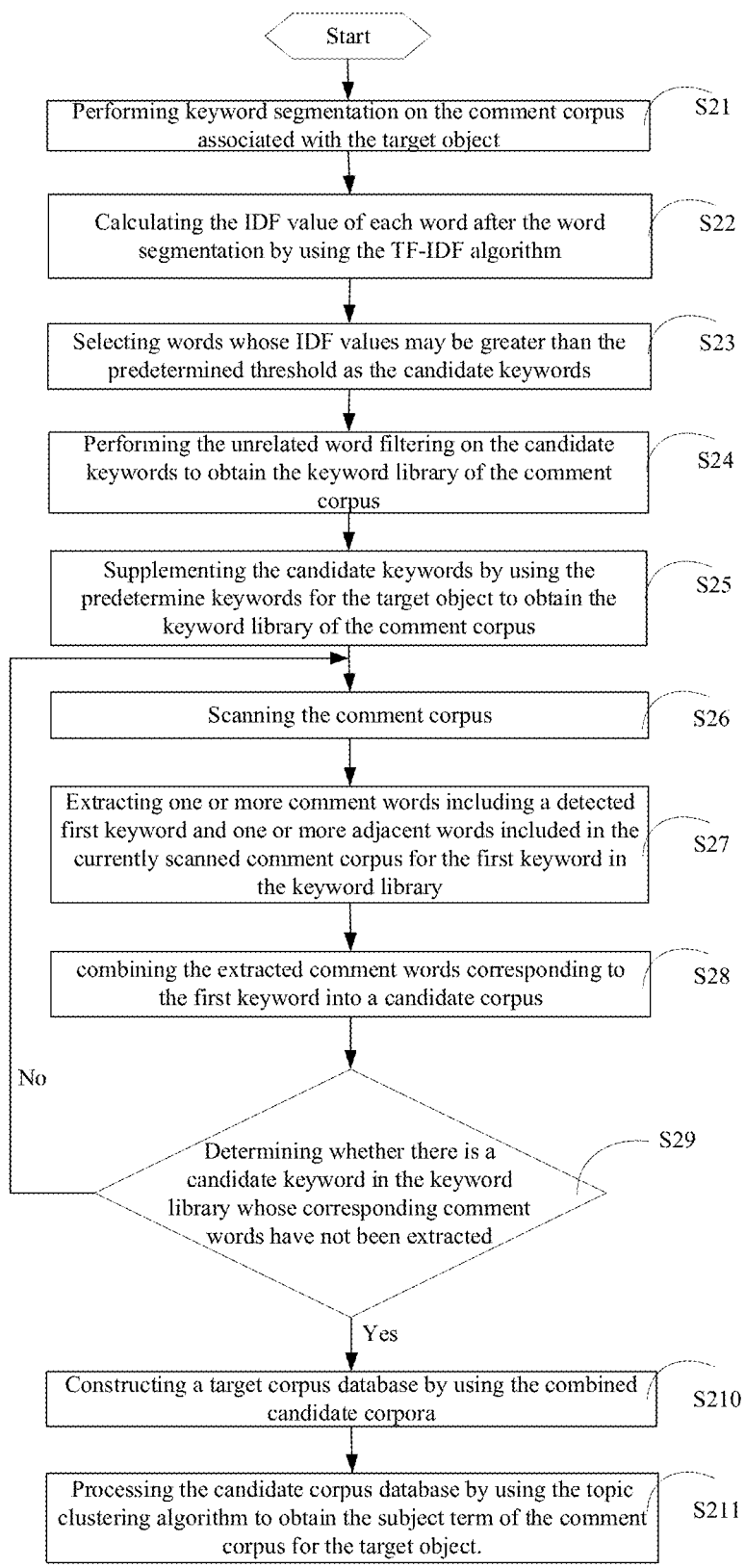
FIG. 2 is a flowchart illustrating another data processing method according to an embodiment of the present disclosure.

FIG. 2 is a flowchart illustrating another data processing method according to an embodiment of the present disclosure. The data processing method is described in more detail below.

S21, performing word segmentation on the comment corpus associated with the target object.

In some embodiments, the comment corpus may be obtained through a third party. Further, the comment corpus corresponding to a user identifier and associated with the target object of each application platform may be obtained by using a plurality of user identifiers. The implementation manner of acquiring the comment corpus is not limited in the present disclosure.

S22, calculating the IDF value of each word after the word segmentation by using the TF-IDF algorithm.

S23, selecting words whose IDF values may be greater than the predetermined threshold as the candidate keywords.

S24, performing the unrelated word filtering on the candidate keywords to obtain the keyword library of the comment corpus.

In one embodiment, the unrelated words may be the comment words such as the various personal pronouns that may not be related to the features of the target object. Further, the unrelated words corresponding to the different comment corpora may be different. The method of determining the unrelated words and the content of the unrelated words is not limited in the present disclosure.

S25, supplementing the candidate keywords by using the predetermine keywords for the target object to obtain the keyword library of the comment corpus.

In the present embodiment, the predetermined keywords may be the subject terms commonly used in the field of the target object. In particular, the content of the predetermined keywords may be different for different target objects. For example, if the target object is a cellphone, the predetermined keywords may include standby time, performance, etc.; if the target object is a watch, the corresponding predetermined keywords may include waterproof, accuracy, longevity, etc., and other predetermined keywords are not listed in the present disclosure.

It can be seen that by supplementing the subject terms in the industry, the obtained keyword library may be more comprehensive, which may lay a strong foundation for accurately obtaining the subject terms of the target object.

S26, scanning the comment corpus.

In some embodiments, the scanning may start with the first comment corpus in the comment corpus database. Of course, the scanning may be performed using other methods. In addition, the scanning order of the comment corpus in the comment corpus database is not limited in the present disclosure.

S27, extracting one or more comment words including a detected first keyword and one or more adjacent words included in the currently scanned comment corpus for the first keyword in the keyword library.

In particular, the adjacent words may be within the predetermined length range from the first keyword, and the first keyword may be any keyword in the keyword library, and it may not refer to a certain keyword. It can be seen that, in the present disclosure, for each keyword in the keyword library the corresponding comment words may be determined by performing the method of S27.

In one embodiment, when determining comment words corresponding to the keyword, the window having the predetermined length may be used to extract the comment words including the first keyword from the currently scanned comment corpus. It should be noted that the length of the window having the predetermined length may be greater than the character length of the first keyword to ensure that the selected comment words of the window having the predetermined length may include the keyword while including other words.

In the implementation of the present embodiment, a window having a predetermined length for a fixed position may be arranged, and the word in the window may be detected in real time. Subsequently, the corresponding IDF value may be calculated by using the method mentioned above to determine whether the detected word may be a candidate keyword. More specifically, after determining the first keyword, the first character of the first keyword may be used as the first character in the window having the predetermined length, or the last character of the first keyword may be used as the last character of the window to determine the comment word in the window.

Of course, in the present disclosure, it may be possible to analyze the position of the keyword appearing in the comment corpus by using the historical operation data, and the window having the predetermined length may be arranged at a position to obtain the comment word of the candidate keyword. However, the present disclosure does not limit the specific implementation manner of determining the comment word of the candidate keyword by using the window having the predetermined length at the fixed position.

In one embodiment, the window having the predetermined length may be moved based on the specific content of the comment corpus to obtain the comment word of the candidate keyword. More specifically, if a candidate keyword is scanned during the scanning of the comment corpus, a window having the predetermined length may be generated thereon. Further, the position of the window having the predetermined length may be adjusted based on the words before and after the candidate keyword. Subsequently, the word in the window having the predetermined length may be determined as the comment word corresponding to the candidate keyword.

Referring to FIG. 3, after the keyword "battery" is detected, the window having the predetermined length may be moved to the position, and the comment word (such as "the battery charging time is long") corresponding to the keyword may be selected, but the present disclosure is not limited herein.

In addition, in the present disclosure, after the candidate keyword is scanned, the n words before and/or after the candidate keyword may be directly used as the comment word, where n may be an integer greater than or equal to 1. Further, the implementation manner of determining the comment word of the candidate keyword is not limited in the present disclosure.

S28, combining the extracted comment words corresponding to the first keyword into a candidate corpus.

The combination order of the obtained plurality of comment words of first keywords is not limited in the present disclosure, and the comment words may be combined in any order.

S29, determining whether there is a candidate keyword in the keyword library whose corresponding comment words have not been extracted, if yes, return to S26; if no, process to S210.

S210, constructing a target corpus database by using the combined candidate corpora.

S211, processing the candidate corpus database by using the topic clustering algorithm to obtain the subject term of the comment corpus for the target object.

The target object will be described below by using an electronic device as an example. By using the method described above, the obtained keyword library may include: battery, battery capacity, power consumption, screen brightness, processor type, etc.; and the subject term obtained by clustering may be battery life. Therefore, the user's concern of the electronic device may be its battery life. Knowing this, developers may research and optimize the electronic device by extending its battery life.

In summary, for a comment corpus composed of short texts, the method provided in the present disclosure may be used to first extract a plurality of keywords included therein to construct a keyword library. Subsequently, the comment words of the same keyword may be combined into a long text document. As such, the topic clustering algorithm may be used to cluster the long text document, and the subject terms (which may be the user's focus on the target object) of the comment corpus may be accurately obtained. The data processing method provided in the present disclosure may improve the situation of not being able to obtain the accurate subject term by directly using the topic clustering to process the comment corpus of the short texts. Further, the entire processing process may not require the manually extraction of the subject information, which may reduce the labor cost and improve the data processing efficiency.

Figure 4:
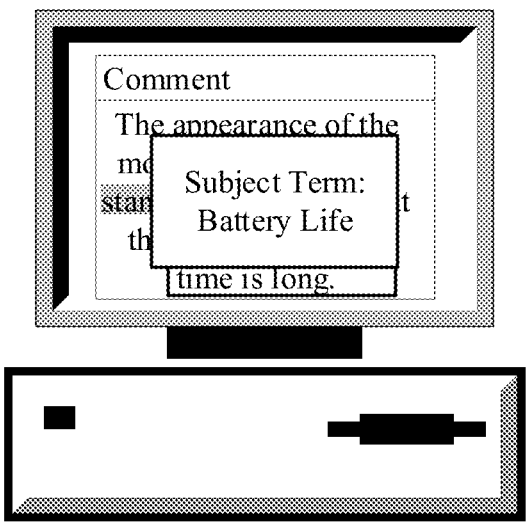
FIG. 4 is a diagram illustrating a display of a subject term according to an embodiment of the present disclosure.

As shown in FIG. 4, in one embodiment of the present disclosure, the subject term for the target object in the obtained comment corpus may be directly displayed on a current display area. More specifically, the subject term may be displayed in a predetermined area, or the subject term may be displayed in a pop-up window. However, the display method of the subject term is not limited in the present disclosure.

In one embodiment, the obtained keyword library may be stored as needed, and the obtained keyword library may be output after detecting a corresponding query instruction. As such, developers may use the obtained keyword library as a reference to improve the target object.

Figure 5:
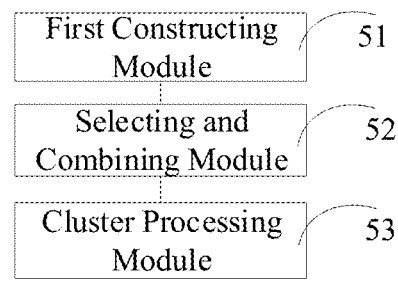
FIG. 5 is a structural block diagram illustrating a data processing apparatus according to an embodiment of the present disclosure.

FIG. 5 is a structural block diagram illustrating a data processing apparatus according to an embodiment of the present disclosure. The data processing apparatus includes a first constructing module 51. The first constructing module 51 may be configured to construct the keyword library of the comment corpus by using the obtained comment corpus associated with the target object.

Figure 6:
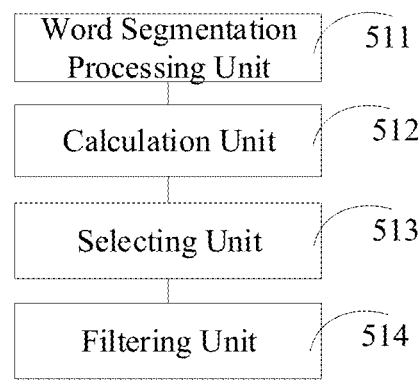
FIG. 6 is a structural block diagram illustrating another data processing apparatus according to an embodiment of the present disclosure.

In one embodiment, as shown in FIG. 6, the first constructing module 51 may include:

A word segmentation processing unit 511 configured to perform word segmentation processing on the comment corpus associated with the target object.

A calculation unit 512 configured to calculate the IDF value of each word after the word segmentation by using the TF-IDF algorithm.

A selecting unit 513 configured to select words whose IDF values may be greater than the predetermined threshold as the candidate keywords.

A filtering unit 514 configured to filter the unrelated word on the obtained candidate keywords to obtain the keyword library of the comment corpus.

In particular, the unrelated word may be a comment word that is not related to the features of the target object.

In one embodiment, after obtaining the candidate keywords, the candidate keywords may be supplemented by using the subject terms (i.e., the predetermined keywords) in the industry. Alternatively, the candidate keywords may be supplemented by using the predetermined keywords after obtaining the keyword library. As such, the obtained keyword library may be more comprehensive such that the accuracy of the obtained subject terms for the target object may be improved.

Figure 7:
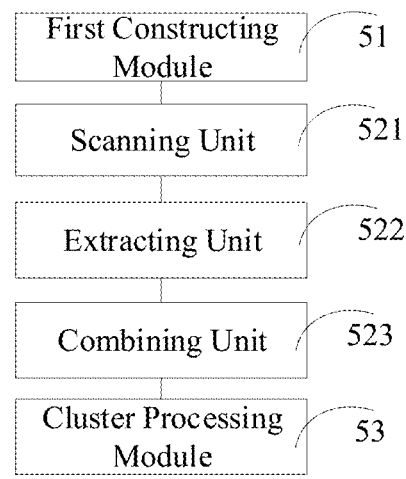
FIG. 7 is a structural block diagram illustrating yet another data processing apparatus according to an embodiment of the present disclosure.

As shown in FIG. 5, the data processing apparatus further includes a selecting and combining module 52. The selecting and combining module 52 may be configured to select the comment words in the comment corpus including the first keyword in the keyword library, and combine the comment words to obtain the candidate corpus of the first keyword. The comment words may be a part of the comment corpus including the first keyword. More specifically, as shown in FIG. 7, the selecting or combining module 52 includes a scanning unit 521 configured to scan the comment corpus; and an extracting unit 522 configured to extract one or more comment words including a detected first keyword and one or more adjacent words included in the currently scanned comment corpus for a first keyword in the keyword library. In one embodiment, the distance between the adjacent words and the first keyword may be within a predetermined length range. The predetermined length range is not limited in the present disclosure, and it may be determined based on the character length of the first keyword.

In one embodiment, a window having a predetermined length may be used to extract the comment words including the first keyword from the currently scanned comment corpus. The length of the window having the predetermined length may be greater than the character length of the first keyword, and the window having the predetermined length may be a window that is relatively fixed with the position of the first keyword or a window that moves based on the content of the first keyword. For details of the window having the predetermined length, reference may be made to the description of the corresponding parts in the foregoing method embodiments, and details are not described herein again.

As shown in FIG. 5, the data processing apparatus further includes a combining unit 523 configured to combine the extracted comment words corresponding to the first keyword into a candidate corpus.

It should be noted that the combination order of the plurality of comment words of first keywords is not limited in the present disclosure.

As shown in FIG. 5, the data processing apparatus further includes a cluster processing module 53. The cluster processing module 53 may be configured to perform the topic clustering processing on the candidate corpus database of each keyword to obtain the subject term for the target object of the comment corpus.

In one embodiment, a topic clustering algorithm such as the Latent Dirichlet Allocation (LDA) module may be used to process the candidate corpus database, and the specific implementation process is not described in detail herein.

In accordance with the embodiments of the present disclosure, a long text including the first keyword may be obtained by constructing the keyword library of the comment corpus associated with the target object, filtering the comment corpus including comment words of the first keyword in the keyword library, and combining the comment words of the first keyword to obtain the candidate corpus. Further, topic clustering may be performed on the candidate corpus of each keyword, and the subject term for the target object in the comment corpus may be accurately obtained. The data processing apparatus provided in the present disclosure may be used to improve the situation of obtaining a plurality of subject terms by directly applying the topic clustering algorithm on the short text corpus. Further, it may not be necessary to manually extract the subject term from the short text corpus, which may reduce the manpower and resource consumption, and greatly improve the work efficiency.

It should be understood that the first constructing module 51, selecting and combining module 52, and cluster processing module 53 may be combined in one module, or any one of the modules may be divided into multiple modules. Alternatively, at least some of the functions of one or more of these modules may be combined with at least some of the functions of other modules and implemented in one module. According to an embodiment of the present disclosure, one or more of the above modules may be at least partially implemented as a hardware circuit. For example, the hard ware circuit can be a field programmable gate array (FPGA), a programmable logic array (PLA), a system-on-chip, a system-on-substrate, a system-on-package and an application specific integrated circuit (ASIC), etc. In some other embodiments, one or more of the above modules may be implemented in any other reasonable manner that integrates or encapsulates the circuit using hardware or firmware. In some other embodiments, one or more of the above modules may be implemented in an appropriate combination of three forms of software, hardware, and firmware. Alternatively, one or more of the above modules may be at least partially implemented as a computer program module, and when the program is executed by a computer, the functions of the corresponding modules may be achieved.

The data processing apparatus described above is mainly from the perspective of the virtual function modules, and the perspective of implementing the hardware structure of the data processing apparatus mentioned above will be described below.

Figure 8:
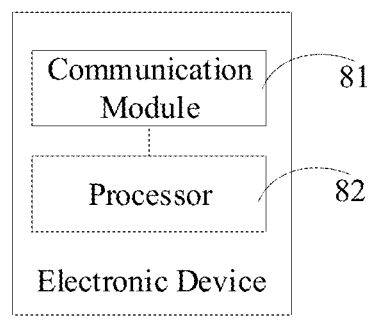
FIG. 8 is a structural diagram of an electronic according to an embodiment of the present disclosure.
Figure 9:
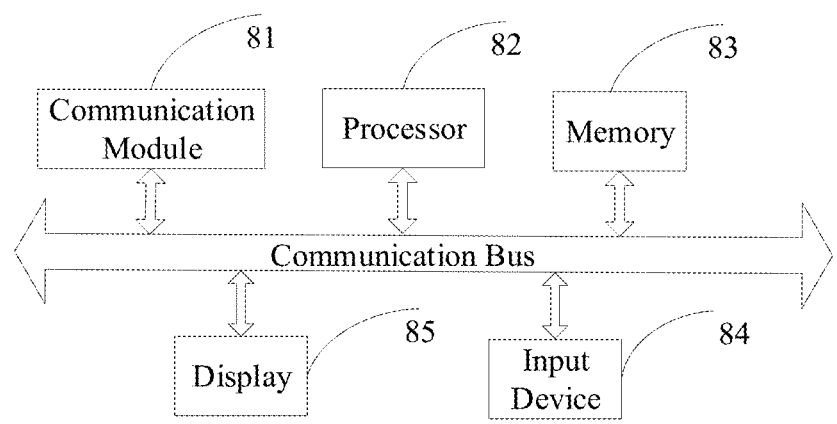
FIG. 9 is a hardware configuration diagram of the electronic device according to an embodiment of the present disclosure.

FIG. 8 is a structural diagram of an electronic according to an embodiment of the present disclosure, and FIG. 9 is a hardware configuration diagram of the electronic device according to an embodiment of the present disclosure. The electronic device may be a computer, a mobile phone, or the like, and the product type of the electronic device is not limited in the present disclosure.

In one embodiment, the electronic device includes a communication module 81. The communication module 81 may be configured to obtain the comment corpus associated with the target object.

In some embodiments, the comment corpus associated with the target object may be obtained through a third party. As such, the electronic device may establish a communication connection with a third party device through the communication module 81 and obtain the comment corpus.

It should be noted that the specific structure of the communication module 81 is not limited in the present disclosure. For example, the communication module 81 may be a wireless communication module or a wired communication module, such as a GSM module, a WIFI module, a Bluetooth module, or the like.

In one embodiment, the electronic device includes a process 82. The processor may be configured to construct the keyword library of the comment corpus by using the comment corpus; select the comment words in the comment corpus including the first keyword in the keyword library and combining the comment words to obtain the candidate corpus of the first keyword, where the comments words may be a part of the comment corpus including the first keyword; and performing topic clustering processing on the obtained candidate corpus of each keyword to obtain the subject term of the comment words for the target object.

For the specific process for the processor 82 to implement the function describe above, reference may be made to the description of the corresponding portion of the foregoing method embodiment, and details will not be described herein again.

In one embodiment, the processor 82 may include, for example, general purpose microprocessors, instruction set processors and/or associated chips sets and/or special purpose microprocessors (e.g., Application Specific Integrated Circuits (ASICs)), and the like. The processor may also include an on-board memory for cache purposes.

In one embodiment, as shown in FIG. 9, the electronic device further includes a memory 83. The memory 83 may be configured to store the obtained comment corpus, and information such as the obtained keyword library and the subject term as needed, and the present disclosure does not limit the storage method of the data.

In some embodiment, the memory 83 may include a high-speed RAM memory, a computer readable storage medium, such as one or more disk memories or the like.

The computer readable storage medium may be any medium that can store computer executable instructions. For example, the computer-readable medium may include, but is not limited to, an electronic, magnetic, optical, electromagnetic, infrared or semiconductor system, apparatus, or device. Further, examples of the computer-readable medium include: a magnetic storage device such as a magnetic tape or a hard disk (HDD); an optical storage device such as a compact disk read-only memory (CD-ROM); and/or a memory such as a random-access memory (RAM) or a flash memory.

The computer readable storage medium may store a computer program. The computer program may include codes/computer executable instructions that, when executed by a processor, may cause the processor to perform operations of the method process described above in combination with FIG. 2 through FIG. 4 and any variations thereof.

The computer program may be configured to include, for example, computer program codes including a computer program module. For example, in some embodiments, the codes in the computer program may include one or more program modules. It should be noted that the division manner and the number of modules may not be fixed, and those skilled in the art may use the appropriate program modules or the combination of program modules according to the actual situations. When these program module combinations are executed by the processor, the processor may perform the method process described above in combination with FIG. 2 through FIG. 4 and any variations thereof.

As shown in FIG. 9, the electronic device may further include an input device 84. The input device may be configured to acquire a predetermined keyword of the target object to supplement the keyword library.

In one embodiment, the input device may include a keyboard, a mouse, or a voice collector or the like. Further, the input device may be determined based on the data input method of the electronic device.

As shown in FIG. 9, the electronic device may further include a display 85. The display 85 may be configured to output the acquired keyword of the target object.

In summary, the electronic device may extract the keywords in the short texts and combine the comment words of the same keyword into a long text. Further, topic clustering may be performed on the obtained long text to accurately obtain the subject term for the target object in the comment corpus. As such, the use of the topic clustering algorithm on short texts may be improved, and the data processing efficiency may be greatly improve since manual extraction of the topic information is not required.

Another aspect of the present disclosure provides a non-volatile storage medium. The non-volatile storage medium may be used to store computer executable instructions that, when executed by a processor, may be used to implement the data processing method described above.

Another aspect of the present disclosure provides a computer program. The computer program may include computer executable instructions that, when executed by a processor, may be used to implement the data processing method described above.

Another aspect of the present disclosure provides a computer system. The computer system may include one or more processors and one or more memories. The memories may be used to store computer executable instructions that, when executed by the one or more processors, may be used to implement the data processing method described above.

Further, in the present disclosure, relational terms such as first, second, and the like, may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

The embodiments in this specification are described in a progressive manner, each embodiment emphasizes a difference from the other embodiments, and the identical or similar parts between the embodiments may be made reference to each other. Since the apparatus and electronic device disclosed in the embodiments are corresponding to the methods disclosed in the embodiments, the descriptions of the apparatus and electronic device are simple and relevant parts may be made reference to the description of the methods.

It will be understood by those skilled in the art that the features described in the respective embodiments and/or claims of the present disclosure can be combined in various ways, even if such combinations are not explicitly described in the present disclosure. In particular, without departing from the spirit and teaching of the present disclosure, the features described in the respective embodiments and/or claims can be combined in various ways. All of these combinations fall within the scope of the present disclosure.

The description of the disclosed embodiments is provided to illustrate the present invention to those skilled in the art. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A data processing method comprising:
   constructing a keyword library, by a processor, of comment corpus associated with a target object obtained from at least one of a plurality of comment providers, the keyword library comprising a plurality of keywords;
   extracting, by the processor, a plurality of partial comment corpora from the comment corpus, each partial comment corpus of the plurality of partial comment corpora comprising a plurality of comment words including at least one of the plurality of keywords in the keyword library, and one or more adjacent comment words from the comment corpus;
   combining, by the processor, the plurality of partial comment corpora to produce a candidate corpus;
   performing, by the processor, without further user query by a user, a topic clustering process on the candidate corpus of each keyword to obtain a subject term for the target object, the subject term includes at least one term in the candidate corpus and at least one term commonly used in a specific industry corresponding to the target object; and
   displaying, by the processor, to the user the subject term concurrently with the obtained comment corpus being displayed in a window,
   wherein constructing the keyword library of the obtained comment corpus associated with the target object comprises obtaining a plurality of candidate keywords in the obtained comment corpus associated with the target object which includes detecting a word in the window in real time within an area of the window with a predetermined length and at a predetermined position, and determining whether the detected word is a candidate keyword.

2. The method of claim 1, wherein extracting the plurality of partial comment corpora from the obtained comment corpus comprises:
   scanning the comment corpus; and
   extracting a first keyword of the plurality of keywords, wherein a distance between each of the adjacent words and the first keyword is within a predetermined threshold distance.

3. The method of claim 2, wherein the predetermined threshold distance is greater than a character length of the first keyword.

4. The method of claim 1, wherein constructing the keyword library of the obtained comment corpus associated with the target object comprises:
   performing an unrelated word filtering on the obtained candidate keywords to produce the keyword library of the obtained comment corpus, wherein the unrelated word is from a pool of indefinite word types including pronouns and conjunctions.

5. The method of claim 4, further comprising:
   supplementing the keyword library with a plurality of keywords associated with the target object.

6. The method of claim 4, wherein obtaining the plurality of candidate keywords in the obtained comment corpus associated with the target object comprises:
   performing a word segmentation on the obtained comment corpus associated with the target object;

calculating an Inverse Document Frequency (IDF) value of each word after the word segmentation by using a Term Frequency-Inverse Document Frequency (TF-IDF) algorithm; and selecting words with IDF value greater than a threshold as the candidate keywords.

7. A computer program product comprising a non-volatile computer readable storage medium and program instructions stored therein, the program instructions being configured to be executable by a computer to cause the computer to perform operations comprising:

constructing a keyword library of comment corpus associated with a target object obtained from at least one of a plurality of comment providers, the keyword library comprising a plurality of keywords;

extracting a plurality of partial comment corpora from the comment corpus, each partial comment corpus of the plurality of partial comment corpora comprising a plurality of comment words including at least one of the plurality of keywords in the keyword library, and one or more adjacent comment words from the comment corpus;

combining the plurality of partial comment corpora to produce a candidate corpus;

performing, without further user query by a user, a topic clustering process on the candidate corpus of each keyword to obtain a subject term for the target object, the subject term includes at least a term from the candidate corpus and at least a term commonly used in a specific industry corresponding to the target object; and displaying to the user the subject term concurrently with the obtained comment corpus being displayed in a window, wherein constructing the keyword library of the obtained comment corpus associated with the target object comprises obtaining a plurality of candidate keywords in the obtained comment corpus associated with the target object which includes detecting a word in the window in real time within an area of the window with a predetermined length and at a predetermined position, and determining whether the detected word is a candidate keyword.

8. The computer program product of claim 7, wherein extracting the plurality of partial comment corpora from the obtained comment corpus comprises:

scanning the comment corpus; and extracting a first keyword of the plurality of keywords, and a distance between each of the adjacent words and the first keyword being within a predetermined threshold distance.

9. The computer program product of claim 8, wherein the predetermined threshold distance is greater than a character length of the first keyword.

10. The computer program product of claim 7, wherein constructing the keyword library of the obtained comment corpus associated with the target object comprises:

obtaining a plurality of candidate keywords in the obtained comment corpus associated with the target object; and performing an unrelated word filtering on the obtained candidate keywords to produce the keyword library of the obtained comment corpus, wherein the unrelated word is from a pool of indefinite word types including pronouns and conjunctions.

11. The computer program product of claim 10, the operations further comprising:

supplementing the keyword library with a plurality of keywords associated with the target object.

12. The computer program product of claim 10, wherein obtaining the plurality of candidate keywords in the obtained comment corpus associated with the target object comprises:

performing a word segmentation on the obtained comment corpus associated with the target object;

calculating an IDF value of each word after the word segmentation by using a TF-IDF algorithm; and selecting words with IDF value greater than a threshold as the candidate keywords.

13. An electronic device comprising:

a communication module configured to obtain a comment corpus associated with a target object from at least one of a plurality of comment providers; and a processor configured to:

construct a keyword library of the obtained comment corpus;

extract a plurality of partial comment corpora including a first keyword from the keyword library, and combine the partial comment corpora to obtain a candidate corpus of the first keyword, wherein a comment word is a partial comment corpus including the first keyword and one or more adjacent comment words from the comment corpus;

perform, without further user query by a user, a topic clustering process on the candidate corpus of each keyword to obtain a subject term for the target object, the subject term includes at least a term from the candidate corpus and at least a term commonly used in a specific industry corresponding to the target object; and display, to the user, the subject term concurrently with the obtained comment corpus being displayed in a window, wherein constructing the keyword library of the obtained comment corpus associated with the target object comprises obtaining a plurality of candidate keywords in the obtained comment corpus associated with the target object which includes detecting a word in the window in real time within an area of the window with a predetermined length and at a predetermined position, and determining whether the detected word is a candidate keyword.

14. The electronic device of claim 13, further comprising:

an input device configured to obtain a plurality of keywords associated with the target object to supplement the keyword library; and a display configured to output the subject term of the target object.

15. The electronic device of claim 13, wherein the processor is further configured to:

scan the comment corpus;

extract the first keyword and one or more adjacent words in a currently scanned comment corpus in the keyword library; and combine the extracted comment corpora corresponding to the first keyword into the candidate corpus, wherein a distance between each of the adjacent words and the first keyword is within a predetermined distance.

16. The electronic device of claim 15, wherein the processor is further configured to:

extract the partial comment corpora including the first keyword from the currently scanned comment corpus by using a window having a predetermined length, wherein the length of the window is greater than a character length of the first keyword.

17. The electronic device of claim 13, wherein the processor is further configured to: obtain a plurality of candidate keywords in the comment corpus associated with the target object; and perform an unrelated word filtering on the obtained candidate keywords to obtain the keyword library of the comment corpus, wherein the unrelated word is from a pool of indefinite word types including pronouns and conjunctions.

18. The electronic device of claim 17, wherein the processor is further configured to:

supplement the keyword library with a plurality of keywords associated with the target object.

19. The electronic device of claim 17, wherein the processor is further configured to:

perform a word segmentation on the comment corpus associated with the target object;

calculate an IDF value of each word after the word segmentation by using a TF-IDF algorithm; and select words with IDF value greater than a threshold as the candidate keywords.

\* \* \* \* \*